(12) United States Patent
Huang (10) Patent No.: US 10,067,936 B2
(45) Date of Patent: Sep. 4, 2018

(54) MACHINE TRANSLATION OUTPUT RERANKING

(71) Applicant: Facebook, Inc., Menlo Park, CA (US)

(72) Inventor: Fei Huang, Boonton, NJ (US)

(73) Assignee: FACEBOOK, INC., Menlo Park, CA (US)

( * ) Notice: Subject to any disclaimer, the term of this patent is extended or adjusted under 35 U.S.C. 154(b) by 227 days.

(21) Appl. No.: 14/586,022

(22) Filed: Dec. 30, 2014

(65) Prior Publication Data

US 2016/0188576 A1 Jun. 30, 2016

(51) Int. Cl.
*G06F 17/28* (2006.01)

(52) U.S. Cl.
CPC ........ *G06F 17/289* (2013.01); *G06F 17/2854* (2013.01)

(58) Field of Classification Search
None
See application file for complete search history.

(56) References Cited

U.S. PATENT DOCUMENTS

| | | |
|---|---|---|
| 5,293,581 A | 3/1994 | DiMarco et al. |
| 5,477,451 A | 12/1995 | Brown et al. |
| 5,510,981 A | 4/1996 | Berger et al. |
| 5,799,193 A | 8/1998 | Sherman et al. |
| 5,991,710 A | 11/1999 | Papineni et al. |
| 6,002,998 A | 12/1999 | Martino et al. |
| 6,157,905 A | 12/2000 | Powell |
| 6,161,082 A | 12/2000 | Goldberg |
| 6,223,150 B1 | 4/2001 | Duan et al. |
| 6,266,642 B1 | 7/2001 | Franz et al. |
| 6,304,841 B1 | 10/2001 | Berger et al. |
| 6,377,925 B1 | 4/2002 | Newman et al. |
| 6,393,389 B1 | 5/2002 | Chanod et al. |
| 6,629,095 B1 | 9/2003 | Wagstaff et al. |
| 7,054,804 B2 | 5/2006 | Gonzales et al. |
| 7,110,938 B1 | 9/2006 | Cheng et al. |
| 7,359,861 B2 | 4/2008 | Lee et al. |
| 7,533,019 B1 | 5/2009 | Riccardi et al. |
| 7,664,629 B2 | 2/2010 | Dymetman et al. |
| 7,813,918 B2 | 10/2010 | Muslea et al. |

(Continued)

OTHER PUBLICATIONS

Non-Final Office Action dated Dec. 17, 2015, for U.S. Appl. No. 14/302,032 of Saint Cyr, L., filed Jun. 11, 2014.

(Continued)

*Primary Examiner* — Richa Mishra (57) ABSTRACT

Technology is disclosed to select a preferred machine translation from multiple machine translations of a content item, each machine translation from the multiple machine translations created for the same target language. Each machine translation is assigned a score based on feedback from a user group that receives the machine translation. The machine translation with the highest score is identified as the preferred machine translation, and is provided in response to subsequent requests for translations of the content item. If there is no preferred translation, the several top scoring machine translations are provided to a larger group of users for further scoring. This process may be repeated until either a clearly preferred translation is identified, a maximum number of iterations is reached, or a maximum number of scoring users is reached.

17 Claims, 7 Drawing Sheets

(56) References Cited

U.S. PATENT DOCUMENTS

| | | | |
|---|---|---|---|
| 7,827,026 B2 | 11/2010 | Brun et al. | |
| 7,895,030 B2 | 2/2011 | Al-Onaizan et al. | |
| 7,983,903 B2 | 7/2011 | Gao et al. | |
| 8,015,140 B2 | 9/2011 | Kumar et al. | |
| 8,145,484 B2 | 3/2012 | Zweig et al. | |
| 8,175,244 B1 | 5/2012 | Frankel et al. | |
| 8,204,739 B2 | 6/2012 | Lane et al. | |
| 8,209,333 B2 | 6/2012 | Hubbard et al. | |
| 8,265,923 B2 | 9/2012 | Chatterjee et al. | |
| 8,275,602 B2 | 9/2012 | Curry et al. | |
| 8,386,235 B2 | 2/2013 | Duan et al. | |
| 8,543,580 B2 | 9/2013 | Chen et al. | |
| 8,756,050 B1* | 6/2014 | Harkness | G06F 17/289 704/1 |
| 8,825,466 B1 | 9/2014 | Wang et al. | |
| 8,825,759 B1 | 9/2014 | Ho et al. | |
| 8,831,928 B2 | 9/2014 | Marcu et al. | |
| 8,838,434 B1 | 9/2014 | Liu | |
| 8,874,429 B1 | 10/2014 | Crosley et al. | |
| 8,897,423 B2 | 11/2014 | Nanjundaswamy | |
| 8,935,150 B2 | 1/2015 | Christ | |
| 8,942,973 B2 | 1/2015 | Viswanathan | |
| 8,949,865 B1 | 2/2015 | Murugesan et al. | |
| 8,983,974 B1 | 3/2015 | Ho et al. | |
| 8,990,068 B2 | 3/2015 | Orsini | |
| 8,996,352 B2 | 3/2015 | Orsini | |
| 8,996,353 B2 | 3/2015 | Orsini | |
| 8,996,355 B2 | 3/2015 | Orsini | |
| 9,009,025 B1 | 4/2015 | Porter et al. | |
| 9,031,829 B2 | 5/2015 | Leydon | |
| 9,104,661 B1 | 8/2015 | Evans | |
| 9,183,309 B2 | 11/2015 | Gupta | |
| 9,231,898 B2 | 1/2016 | Orsini | |
| 9,245,278 B2 | 1/2016 | Orsini | |
| 9,336,206 B1 | 5/2016 | Orsini | |
| 9,477,652 B2 | 10/2016 | Huang et al. | |
| 9,734,142 B2 | 8/2017 | Huang | |
| 9,734,143 B2 | 8/2017 | Rottmann et al. | |
| 9,740,687 B2 | 8/2017 | Herdagdelen et al. | |
| 9,747,283 B2 | 8/2017 | Rottmann et al. | |
| 9,805,029 B2 | 10/2017 | Rottmann et al. | |
| 9,830,386 B2 | 11/2017 | Huang et al. | |
| 9,830,404 B2 | 11/2017 | Huang et al. | |
| 2002/0087301 A1 | 7/2002 | Jones et al. | |
| 2002/0161579 A1 | 10/2002 | Saindon et al. | |
| 2002/0169592 A1 | 11/2002 | Aityan | |
| 2003/0040900 A1 | 2/2003 | D'Agostini et al. | |
| 2004/0002848 A1 | 1/2004 | Zhou et al. | |
| 2004/0049374 A1 | 3/2004 | Breslau et al. | |
| 2004/0098247 A1 | 5/2004 | Moore | |
| 2004/0122656 A1 | 6/2004 | Abir et al. | |
| 2004/0243392 A1 | 12/2004 | Chino et al. | |
| 2005/0021323 A1* | 1/2005 | Li | G06F 17/2735 704/5 |
| 2005/0055630 A1 | 3/2005 | Scanlan et al. | |
| 2005/0228640 A1 | 10/2005 | Aue et al. | |
| 2006/0111891 A1 | 5/2006 | Menezes et al. | |
| 2006/0206798 A1 | 9/2006 | Kohlmeier et al. | |
| 2006/0271352 A1 | 11/2006 | Nikitin et al. | |
| 2007/0130563 A1 | 6/2007 | Elgazzar et al. | |
| 2007/0136222 A1 | 6/2007 | Horvitz et al. | |
| 2008/0046231 A1 | 2/2008 | Laden et al. | |
| 2008/0077384 A1 | 3/2008 | Agapi et al. | |
| 2008/0281578 A1 | 11/2008 | Kumaran et al. | |
| 2009/0070095 A1 | 3/2009 | Gao et al. | |
| 2009/0083023 A1 | 3/2009 | Foster et al. | |
| 2009/0132233 A1 | 5/2009 | Etzioni et al. | |
| 2009/0182547 A1 | 7/2009 | Niu et al. | |
| 2009/0198487 A1 | 8/2009 | Wong et al. | |
| 2009/0210214 A1 | 8/2009 | Qian et al. | |
| 2009/0276206 A1 | 11/2009 | Fitzpatrick et al. | |
| 2009/0281789 A1 | 11/2009 | Waibel et al. | |
| 2009/0326912 A1 | 12/2009 | Ueffing et al. | |
| 2010/0042928 A1* | 2/2010 | Rinearson | G06F 15/177 715/737 |
| 2010/0121639 A1 | 5/2010 | Zweig et al. | |
| 2010/0149803 A1 | 6/2010 | Nakano et al. | |
| 2010/0161642 A1 | 6/2010 | Chen et al. | |
| 2010/0194979 A1 | 8/2010 | Blumenschein et al. | |
| 2010/0223048 A1 | 9/2010 | Lauder et al. | |
| 2010/0228777 A1 | 9/2010 | Imig et al. | |
| 2010/0241416 A1 | 9/2010 | Jiang et al. | |
| 2010/0283829 A1 | 11/2010 | De Beer et al. | |
| 2010/0299132 A1 | 11/2010 | Dolan et al. | |
| 2011/0099000 A1 | 4/2011 | Rai et al. | |
| 2011/0137636 A1 | 6/2011 | Srihari et al. | |
| 2011/0246172 A1 | 10/2011 | Liberman et al. | |
| 2011/0246881 A1 | 10/2011 | Kushman et al. | |
| 2011/0252027 A1 | 10/2011 | Chen et al. | |
| 2011/0282648 A1 | 11/2011 | Sarikaya et al. | |
| 2012/0005224 A1 | 1/2012 | Ahrens et al. | |
| 2012/0029910 A1 | 2/2012 | Medlock et al. | |
| 2012/0035907 A1 | 2/2012 | Lebeau et al. | |
| 2012/0035915 A1 | 2/2012 | Kitade et al. | |
| 2012/0047172 A1 | 2/2012 | Ponte et al. | |
| 2012/0059653 A1 | 3/2012 | Adams et al. | |
| 2012/0101804 A1* | 4/2012 | Roth | G06F 17/2818 704/2 |
| 2012/0109649 A1 | 5/2012 | Talwar | |
| 2012/0123765 A1 | 5/2012 | Estelle et al. | |
| 2012/0130940 A1 | 5/2012 | Gattani et al. | |
| 2012/0138211 A1 | 6/2012 | Barger et al. | |
| 2012/0158621 A1 | 6/2012 | Bennett et al. | |
| 2012/0173224 A1 | 7/2012 | Anisimovich et al. | |
| 2012/0209588 A1 | 8/2012 | Wu et al. | |
| 2012/0253785 A1 | 10/2012 | Hamid et al. | |
| 2012/0330643 A1 | 12/2012 | Frei et al. | |
| 2013/0018650 A1 | 1/2013 | Moore et al. | |
| 2013/0060769 A1 | 3/2013 | Pereg et al. | |
| 2013/0084976 A1 | 4/2013 | Kumaran et al. | |
| 2013/0103384 A1 | 4/2013 | Hunter et al. | |
| 2013/0144593 A1* | 6/2013 | Och | G06F 17/2845 704/2 |
| 2013/0144595 A1 | 6/2013 | Lord et al. | |
| 2013/0144603 A1 | 6/2013 | Lord et al. | |
| 2013/0144619 A1 | 6/2013 | Lord et al. | |
| 2013/0173247 A1 | 7/2013 | Hodson et al. | |
| 2013/0246063 A1 | 9/2013 | Teller et al. | |
| 2013/0317808 A1 | 11/2013 | Kruel et al. | |
| 2014/0006003 A1* | 1/2014 | Soricut | G06F 17/2854 704/2 |
| 2014/0006929 A1 | 1/2014 | Swartz et al. | |
| 2014/0012568 A1 | 1/2014 | Caskey et al. | |
| 2014/0025734 A1 | 1/2014 | Griffin et al. | |
| 2014/0059030 A1 | 2/2014 | Hakkani-Tur et al. | |
| 2014/0081619 A1 | 3/2014 | Solntseva et al. | |
| 2014/0108393 A1 | 4/2014 | Angwin et al. | |
| 2014/0163977 A1 | 6/2014 | Hoffmeister et al. | |
| 2014/0195884 A1 | 7/2014 | Castelli et al. | |
| 2014/0207439 A1 | 7/2014 | Venkatapathy, Sr. et al. | |
| 2014/0229155 A1* | 8/2014 | Leydon | G06Q 30/0217 704/2 |
| 2014/0279996 A1 | 9/2014 | Teevan et al. | |
| 2014/0280295 A1 | 9/2014 | Kurochkin et al. | |
| 2014/0280592 A1 | 9/2014 | Zafarani et al. | |
| 2014/0288913 A1 | 9/2014 | Shen et al. | |
| 2014/0288917 A1 | 9/2014 | Orsini et al. | |
| 2014/0288918 A1 | 9/2014 | Orsini et al. | |
| 2014/0303960 A1 | 10/2014 | Orsini et al. | |
| 2014/0335483 A1 | 11/2014 | Buryak et al. | |
| 2014/0337007 A1 | 11/2014 | Fuegen et al. | |
| 2014/0337989 A1 | 11/2014 | Bojja et al. | |
| 2014/0350916 A1 | 11/2014 | Jagpal et al. | |
| 2014/0358519 A1 | 12/2014 | Dymetman et al. | |
| 2014/0365200 A1 | 12/2014 | Sagie | |
| 2014/0365460 A1 | 12/2014 | Portnoy et al. | |
| 2015/0006143 A1 | 1/2015 | Skiba et al. | |
| 2015/0006219 A1 | 1/2015 | Jose et al. | |
| 2015/0033116 A1 | 1/2015 | Severdia et al. | |
| 2015/0046146 A1 | 2/2015 | Crosley et al. | |
| 2015/0066805 A1 | 3/2015 | Taira et al. | |
| 2015/0120290 A1 | 4/2015 | Shagalov | |
| 2015/0134322 A1 | 5/2015 | Cuthbert et al. | |
| 2015/0142420 A1 | 5/2015 | Sarikaya et al. | |

(56) References Cited

U.S. PATENT DOCUMENTS

| | | | |
|---|---|---|---|
| 2015/0161104 A1 | 6/2015 | Buryak et al. |
| 2015/0161110 A1 | 6/2015 | Salz |
| 2015/0161112 A1 | 6/2015 | Galvez et al. |
| 2015/0161114 A1 | 6/2015 | Buryak et al. |
| 2015/0161115 A1 | 6/2015 | Denero et al. |
| 2015/0161227 A1 | 6/2015 | Buryak et al. |
| 2015/0213008 A1 | 7/2015 | Orsini |
| 2015/0228279 A1 | 8/2015 | Moreno et al. |
| 2015/0293997 A1 | 10/2015 | Smith et al. |
| 2015/0363388 A1 | 12/2015 | Herdagdelen et al. |
| 2016/0041986 A1 | 2/2016 | Nguyen |
| 2016/0048505 A1 | 2/2016 | Tian et al. |
| 2016/0092603 A1 | 3/2016 | Rezaei et al. |
| 2016/0162473 A1 | 6/2016 | Hedley et al. |
| 2016/0162477 A1 | 6/2016 | Orsini |
| 2016/0162478 A1 | 6/2016 | Blassin et al. |
| 2016/0162575 A1 | 6/2016 | Eck |
| 2016/0177628 A1 | 6/2016 | Juvani |
| 2016/0188575 A1 | 6/2016 | Sawaf |
| 2016/0188661 A1 | 6/2016 | Zhang et al. |
| 2016/0188703 A1 | 6/2016 | Zhang et al. |
| 2016/0217124 A1 | 7/2016 | Sarikaya et al. |
| 2016/0239476 A1 | 8/2016 | Huang |
| 2016/0267073 A1 | 9/2016 | Noeman et al. |
| 2016/0299884 A1 | 10/2016 | Chioasca et al. |
| 2016/0357519 A1 | 12/2016 | Vargas et al. |
| 2017/0011739 A1 | 1/2017 | Huang et al. |
| 2017/0083504 A1 | 3/2017 | Huang |
| 2017/0169015 A1 | 6/2017 | Huang |
| 2017/0177564 A1 | 6/2017 | Rottmann et al. |
| 2017/0185583 A1 | 6/2017 | Pino et al. |
| 2017/0185586 A1 | 6/2017 | Rottmann et al. |
| 2017/0185588 A1 | 6/2017 | Rottmann et al. |
| 2017/0270102 A1 | 9/2017 | Herdagdelen et al. |
| 2017/0315988 A1 | 11/2017 | Herdagdelen et al. |
| 2017/0315991 A1 | 11/2017 | Rottmann et al. |

OTHER PUBLICATIONS

U.S. Appl. No. 14/302,032 of Herdagdelen, A et al., filed Jun. 11, 2014.
U.S. Appl. No. 14/559,540 of Eck, M et al., filed Dec. 3, 2014.
U.S. Appl. No. 14/621,921 of Huang, F., filed Feb. 13, 2015.
U.S. Appl. No. 14/967,897 of Huang F. et al., filed Dec. 14, 2015.
U.S. Appl. No. 14/980,654 of Pino, J. et al., filed Dec. 28, 2015.
Final Office Action dated Jul. 1, 2016, for U.S. Appl. No. 14/302,032 of Herdagdelen, A., filed Jun. 11, 2014.
Non-Final Office Action dated Mar. 10, 2016, for U.S. Appl. No. 14/621,921 of Huang, F., filed Feb. 13, 2015.
Notice of Allowance dated Jul. 18, 2016, for U.S. Appl. No. 14/621,921 of Huang, F., filed Feb. 13, 2015.
U.S. Appl. No. 15/199,890 of Zhang, Y. et al., filed Jun. 30, 2016.
U.S. Appl. No. 15/244,179 of Zhang, Y., et al., filed Aug. 23, 2016.
International Search Report and Written Opinion for International Application No. PCT/US2015/051737, dated Jul. 28, 2016, 22 pages.
Koehn, P. et al., "Statistical Phrase-Based Translation," Proceedings of the 2003 Conference of the North American Chapter of the Association for computational Linguistics on Human Language Technology—vol. 1, Assoc. for Computational Linguistics, 2003, p.
Non-Final Office Action dated Dec. 29, 2016, for U.S. Appl. No. 14/586,049 of Huang, F. et al., filed Dec. 30, 2014.
Non-Final Office Action dated Dec. 30, 2016 in U.S. Appl. No. 14/586,074 by Huang, F. et al., filed Dec. 30, 2014.
Non-Final Office Action dated Jul. 28, 2016, for U.S. Appl. No. 14/861,747 of F. Huang, filed Sep. 22, 2015.
Non-Final Office Action dated Nov. 9, 2016, for U.S. Appl. No. 14/973,387 by Rottmann, K., et al., filed Dec. 17, 2015.
Non-Final Office Action dated Oct. 6, 2016, U.S. Appl. No. 14/981,794 of Rottmann, K. filed Dec. 28, 2015.

Notice of Allowance dated Apr. 13, 2017, for U.S. Appl. No. 14/973,387 of Rottmann, K., et al., filed Dec. 17, 2015.
Notice of Allowance dated Apr. 19, 2017, for U.S. Appl. No. 14/981,769 by Rottmann, K., et al., filed Dec. 28, 2015.
Notice of Allowance dated Apr. 20, 2017 for U.S. Appl. No. 14/302,032 by Herdagdelen, A., et al., filed Jun. 11, 2014.
Notice of Allowance dated Apr. 7, 2017 for U.S. Appl. No. 14/861,747 by Huang, F., et al., filed Sep. 22, 2015.
Notice of Allowance dated Mar. 1, 2017, for U.S. Appl. No. 14/981,769 by Rottmann, K., et al., filed Dec. 28, 2015.
Sutskever, I., et al., "Sequence to sequence learning with neural networks," Advances in Neural Information Processing Systems, pp. 3104-3112, 2014.
U.S. Appl. No. 14/586,049, by Huang et al., filed Dec. 30, 2014.
U.S. Appl. No. 14/586,074 by Huang et al., filed Dec. 30, 2014.
U.S. Appl. No. 14/861,747 by Huang, F., filed Sep. 22, 2015.
U.S. Appl. No. 14/973,387, of Rottmann, K., et al., filed Dec. 17, 2015.
U.S. Appl. No. 14/981,769 by Rottmann, K., et al., filed Dec. 28, 2015.
U.S. Appl. No. 14/981,794 by Rottmann, K., et al., filed Dec. 28, 2015.
U.S. Appl. No. 15/445,978 by Herdagdelen, A., et al., filed Feb. 28, 2017.
Vogel, S. et al., "HMM-Based Word Alignment in Statistical Translation." In Proceedings of the 16th Conference on Computational Linguistics—vol. 2, Association for Computational Linguistics, 1996, pp. 836-841.
Non-Final Office Action dated Feb. 9, 2017, for U.S. Appl. No. 14/559,540 of Eck, M. et al., filed Dec. 3, 2014.
Non-Final Office Action dated Jan. 12, 2017, for U.S. Appl. No. 15/275,235 of Huang, F. et al., filed Sep. 23, 2016.
Notice of Allowance dated Nov. 30, 2016, for U.S. Appl. No. 14/302,032 of Herdagdelen, A., filed Jun. 11, 2014.
U.S. Appl. No. 15/275,235 of Huang, F. et al., filed Sep. 23, 2016.
Non-Final Office Action dated Jan. 19, 2017, for U.S. Appl. No. 14/980,654 of Pino, J. et al., filed Dec. 28, 2015.
U.S. Appl. No. 15/644,690 of Huang, F. et al., filed Jul. 7, 2017.
Notice of Allowance dated Jul. 12, 2017, for U.S. Appl. No. 14/981,794 by Rottman, K., et al., filed Dec. 28, 2015.
Supplemental Notice of Allowability dated Jul. 13, 2017, for U.S. Appl. No. 14/981,769 by Rottmann, K., et al., filed Dec. 28, 2015.
Corrected Notice of Allowability dated Jul. 13, 2017, for U.S. Appl. No. 14/973,387 of Rottmann, K., et al., filed Dec. 17, 2015.
Notice of Allowance dated Jun. 6, 2017, for U.S. Appl. No. 14/981,794 by Rottman, K., et al., filed Dec. 28, 2015.
Non-Final Office Action dated Jun. 26, 2017, for U.S. Appl. No. 15/445,978 of Herdagdelen, A., filed Feb. 28, 2017.
Final Office Action dated Aug. 10, 2017 for U.S. Appl. No. 15/275,235 by Huang, F. et al. filed Sep. 23, 2016.
Final Office Action dated Aug. 25, 2017 for U.S. Appl. No. 14/980,654 by Pino, J. et al., filed Dec. 28, 2015.
Non-Final Office Action dated Aug. 25, 2017 for U.S. Appl. No. 15/652,175 by Herdagdelen, A., filed Jul. 17, 2017.
Non-Final Office Action dated Aug. 29, 2017 for U.S. Appl. No. 14/967,897 by Huang, F., filed Dec. 14, 2015.
Notice of Allowance dated Aug. 30, 2017 for U.S. Appl. No. 14/559,540 by Eck, M. et al. filed Dec. 3, 2014.
Notice of Allowance dated Aug. 4, 2017 for U.S. Appl. No. 14/981,794 by Rottman, K., et al., filed Dec. 28, 2015.
Notice of Allowance dated Jul. 26, 2017 for U.S. Appl. No. 14/586,074 by Huang, F., et al., filed Dec. 30, 2014.
Notice of Allowance dated Jul. 28, 2017 for U.S. Appl. No. 14/586,049 by Huang, F., et al., filed Dec. 30, 2014.
U.S. Appl. No. 15/652,144 of Rottmann, K., filed Jul. 17, 2017.
U.S. Appl. No. 15/654,668 of Rottmann, K., filed Jul. 19, 2017.
Corrected Notice of Allowability dated Nov. 17, 2017, for U.S. Appl. No. 14/559,540 of Eck, M. et al., filed Dec. 3, 2014.
Notice of Allowance dated Dec. 8, 2017 for U.S. Appl. No. 15/652,175 by Herdagdelen, A., filed Jul. 17, 2017.
Corrected Notice of Allowability dated Dec. 12, 2017, for U.S. Appl. No. 14/559,540 of Eck, M. et al., filed Dec. 3, 2014.
U.S. Appl. No. 15/820,351 by Huang et al., filed Nov. 21, 2017.

(56) References Cited

OTHER PUBLICATIONS

U.S. Appl. No. 15/821,167 by Huang et al., filed Nov. 22, 2017.
Final Office Action dated Sep. 8, 2017 for U.S. Appl. No. 15/445,978 of Herdagdelen, A. filed Feb. 28, 2017.
Notice of Allowability dated Sep. 12, 2017 for U.S. Appl. No. 14/981,794 by Rottman, K., et al., filed Dec. 28, 2015.
Notice of Allowability dated Sep. 19, 2017 for U.S. Appl. No. 14/559,540 by Eck, M. et al. filed Dec. 3, 2014.
Notice of Allowance dated Oct. 10, 2017 for U.S. Appl. No. 15/275,235 for Huang, F. et al., filed Sep. 23, 2016.
Notice of Allowance dated Oct. 23, 2017 for U.S. Appl. No. 15/445,978 of Herdagdelen, A. filed Feb. 28, 2017.
U.S. Appl. No. 15/672,690 of Huang, F., filed Aug. 9, 2017.
U.S. Appl. No. 15/696,121 of Rottmann, K. et al., filed Sep. 5, 2017.
U.S. Appl. No. 15/723,095 of Tiwari, P. filed Oct. 2, 2017.

\* cited by examiner

MACHINE TRANSLATION OUTPUT RERANKING

BACKGROUND

Users reviewing online information (e.g., via a web page, a social media post, etc.) are often interested in translations of content items included in the online information. For example, users might be interested in translations of words, sentences, phrases, paragraphs, or even pages. To provide the translations to users on demand, as and when requested, it is desirable to provide computer-implemented machine translations of content items. Often, machine translations are generated using natural language processing (NLP) algorithms. NLP algorithms take a content item, including any item containing language including text, images, audio, video, or other multi-media, as input and generate a machine translation which is then presented to users. However, content items can be inaccurately translated due to, for example, variants of the same language (e.g., American English versus British English), different meanings of the same word, non-standard phrases (e.g., slang), etc. For example, the word "lift" can mean "move upward" among speakers of American English (as that word is commonly used in America), whereas it can mean "elevator" for British English speakers. A content item including the phrase, "press the button for the lift," could be translated into either "press the button for the elevator" or "press the button to go up." In addition, machine translations of a content item are often based on dictionary translations and do not consider context, which often makes a significant difference such as in slang or colloquial passages.

DETAILED DESCRIPTION

When translating a content item, a machine translation output reranking system can create multiple possible translations automatically, e.g. by using various machine translation engines. Each possible translation can be incorporated into a web page or social media post. Users viewing web pages and/or social media posts can be asked to review (e.g. provide feedback for) the translations. Using the review results, a preferred translation can be selected to use for future viewers. Thus, according to implementations of the present disclosure, based on crowd-sourced determinations of the quality of machine translations, a preferred machine translation of a content item from multiple machine translations of the content item can be selected. More specifically, different algorithms can be used to generate different translations of the same content item, and feedback can be received from users regarding the quality of each machine translation. The received feedback can then be used to compute an aggregate score for the machine translations. The machine translation that gets the highest aggregate score can be identified as the preferred translation.

For example, a social media post (i.e., a content item) in German can be translated into multiple English translations using different machine translation engines. These multiple English translations can then be provided by a computer server to various groups of English language users. For example, a first group receives the first translation, a second group receives the second translation, and so on. After receiving the translations, the English language users can review the machine translations and provide their review regarding the quality of the machine translations, such as by clicking on a star rating. The user review (e.g. feedback) of a translation is received by the computer server and can be combined with other user reviews to compute a score for the quality of the translation. This score, for example, can be indicative of a perceived accuracy of a machine translation. The machine translation with the highest score can be declared as the preferred machine translation, and then can be subsequently provided to other users. If there is a tie in the scores, or if there is otherwise no preferred machine translation, then the machine translations with the highest scores, for example those above a threshold level, can be provided to additional user groups for further feedback. The additional user groups, in some implementations, can include some of the users who provided feedback earlier. This process can be repeated until a clearly highest-scoring translation, a "preferred machine translation," is identified. In some implementations, the process can be stopped without identifying a clearly highest-scoring translation when either a maximum number of iterations is reached, or a maximum number of scoring users is reached, at which point the highest scoring machine translation is selected as the preferred machine translation. In some implementations, the results of the scoring can be fed back into the machine translation algorithms as model training data, or to identify particular features, parameters, or engines that provide the best translation.

In some implementations, groups of users selected to provide a review of a translation are based on factors such as their facility with the target language of the machine translation or an association with a classification. For example, a social media post could include a particular soccer slang or a colloquial term that can only be understood by some audiences, e.g., users who speak with a particular English accent in Liverpool. Because of the possibility of context affecting the meaning in the content item, it is likely that users who understand or appreciate the context are better-suited to provide feedback on the quality of a machine translation. In some implementations, the machine translation reranking system associates uses with a classification, such as a topic, a location, a theme, etc. Content items to be translated can also be associated with a classification. Users with a classification matching the content item classification can be selected to review translations.

In some implementations, a particular user can be repetitively polled for his or her feedback on the quality of different machine translations. Thus, the machine translation reranking system can maintain a database of past user feedback and use this database to determine users' historical ratings of computer-generated translations of content items. Such historical data can be used to assign a weight to user feedback, thus adjusting for users who provide consistently low or high ratings as compared to an average rating.

Figure 1:
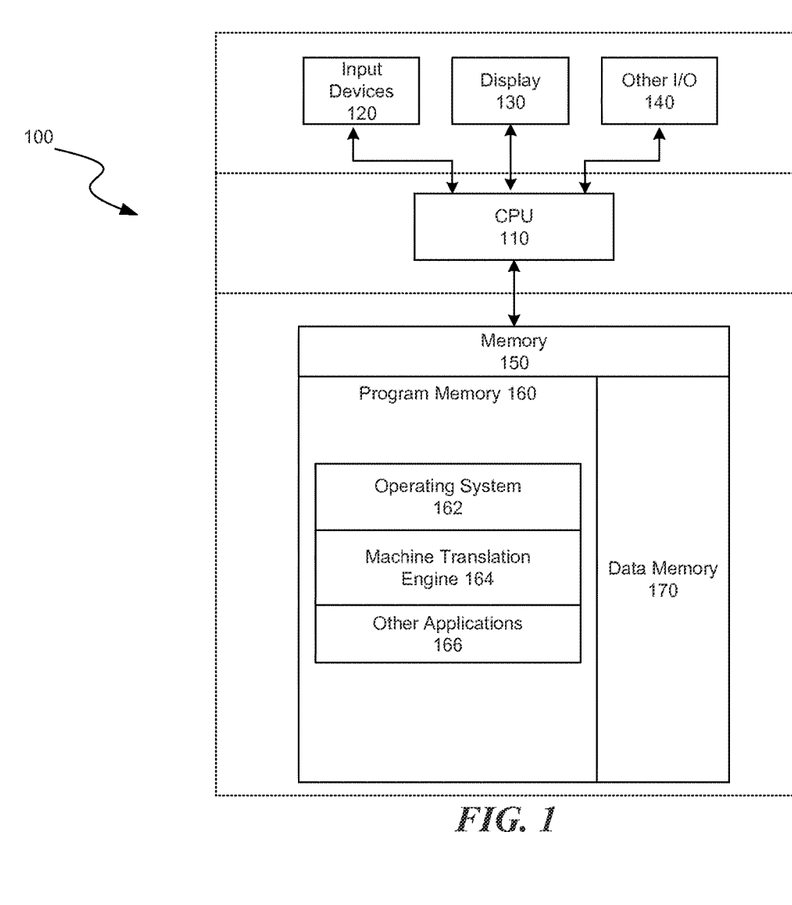
FIG. 1 is a block diagram illustrating an overview of devices on which some implementations of the disclosed technology may operate.

Several implementations of the described technology are discussed below in more detail in reference to the figures. Turning now to the figures, FIG. 1 is a block diagram illustrating an overview of devices 100 on which some implementations of the disclosed technology may operate. The devices can comprise hardware components of a device 100 that identify a preferred machine translation of a content item, from multiple machine translations of the content item generated in the same target language. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 has access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 includes program memory 160 that stores programs and software, such as an operating system 162, machine translation ranker 164, and any other application programs 166. Memory 150 also includes data memory 170 that can include different machine translation algorithms, fixed and/or variable parameters used in the machine translation algorithms, reviews or aggregate scores indicating a quality of one or more machine translations, content items used as inputs to the machine translations, user feedback data, user classification data, user classification algorithms, content item classification algorithms, multiple machine translations of content items, preferred machine translations of content items, configuration data, settings, and user options or preferences which can be provided to the program memory 160 or any element of the device 100.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
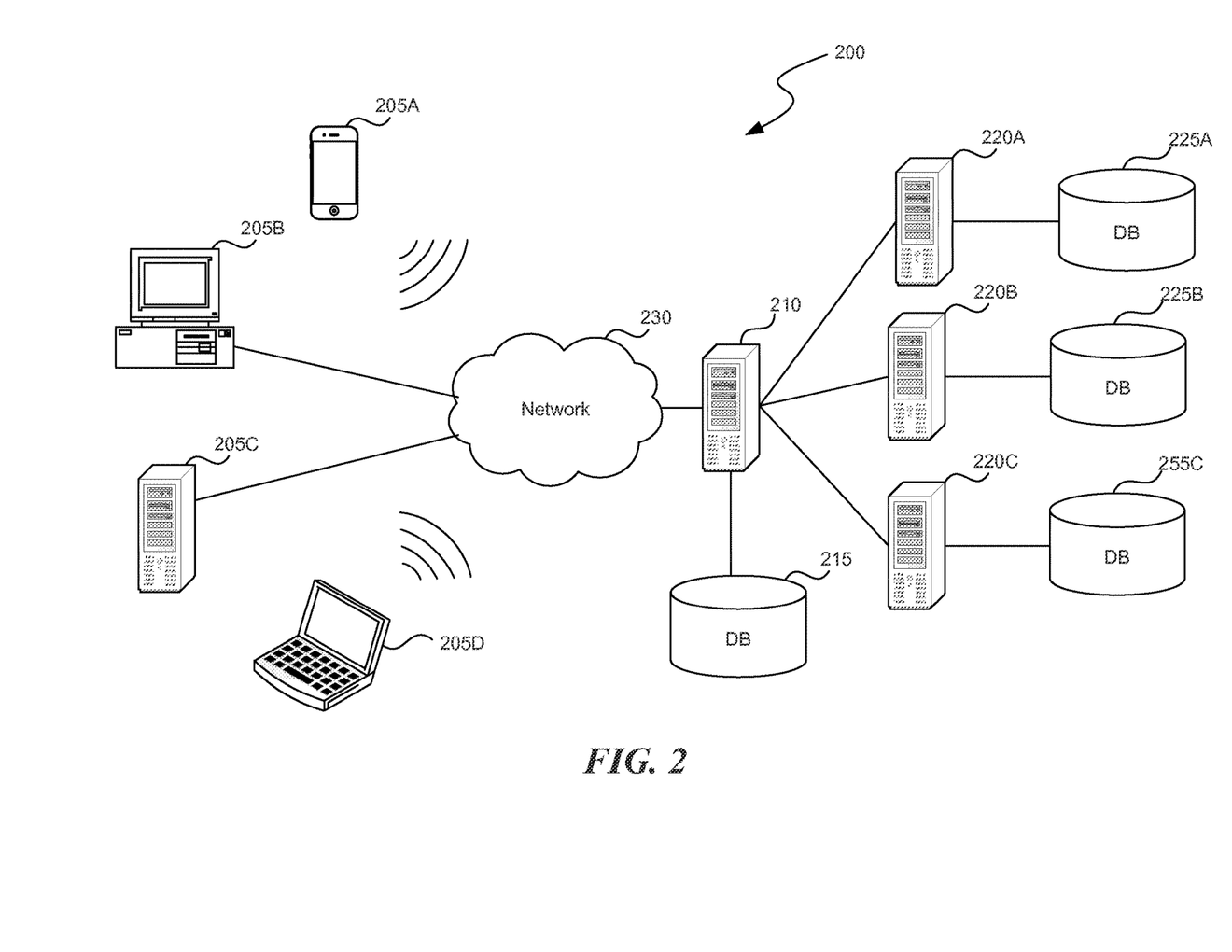
FIG. 2 is a block diagram illustrating an overview of an environment in which some implementations of the disclosed technology may operate.

FIG. 2 is a block diagram illustrating an overview of an environment 200 in which some implementations of the disclosed technology may operate. Environment 200 can include one or more client computing devices 205A-D, examples of which may include device 100. Client computing devices 205 can operate in a networked environment using logical connections 210 through network 230 to one or more remote computers such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 may correspond to a group of servers, and each of these servers can share a database or can have their own database. Databases 215 and 225 can warehouse (e.g. store) information such as different machine translation algorithms, fixed and/or variable parameters used in the machine translation algorithms, reviews or aggregate scores indicating a quality of one or machine translations, content items used as inputs to the machine translations, user feedback data, user classification data, user classification algorithms, content item classification algorithms, multiple machine translations of content items, preferred machine translations of content items, and the like. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. The client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
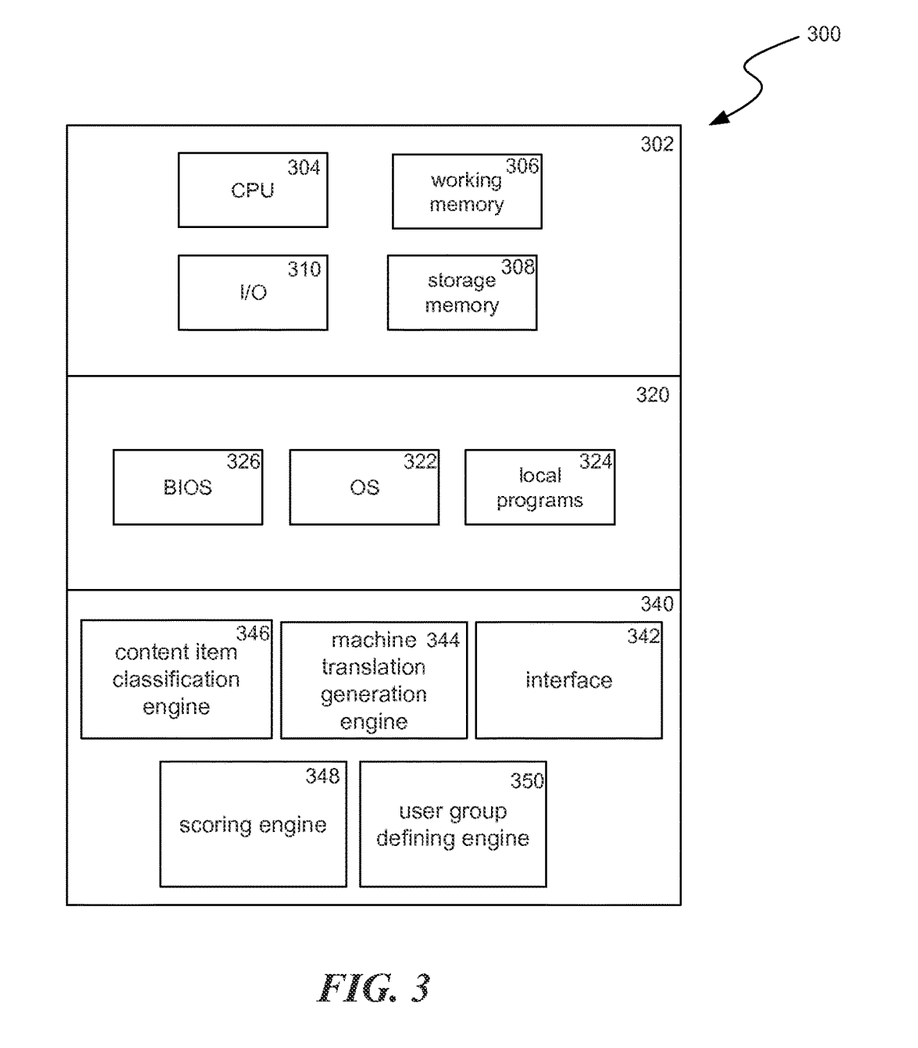
FIG. 3 is a block diagram illustrating components which, in some implementations, can be used in a system implementing the disclosed technology.

FIG. 3 is a block diagram illustrating components 300 which, in some implementations, can be used in a system implementing the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a BIOS 326. Specialized components 340 can be subcomponents of a general software application 320, such as a local program 324. Specialized components 340 can include machine translation generation engine 344, content item classification engine 346, scoring engine 348, user group defining engine 350 and components which can be used for controlling and receiving data from the specialized components, such as interface 342. In some implementations, the machine translation ranker 164 (shown in FIG. 1) can include machine translation generation engines 344, content item classification engine 346, scoring engine 348, and user group defining engine 350.

Machine translation generation engines 344 can generate multiple computer-generated translations of a content item when each of the multiple computer-generated translations of the content item are created in the same target language. In some implementations, the machine translation generation engines 344 can be adjusted by implementing different algorithms, parameters, and classifiers for performing machine translations. Additionally, user feedback (or the outcome of scoring engine 348) received in connection with a machine translation can also be an input to machine translation generation engines 344 as model training data, or to identify particular features, parameters, or even algorithms that provide better machine translations.

Content item classification engine 346 can be configured to classify a content item into one or more categories or sub-categories, based, for example, on a topic of interest, a location, a theme, or a source of the content item. This classification can be according to one or more classification algorithms.

User group defining engine 350 provides translations of the content item to groups of users and receives feedback from the groups of users. Thus, a "user group" comprises users who will be polled for feedback on the quality (e.g., a perceived accuracy) of a machine translation of a content item. In some implementations, the user group defining engine 350 classifies users into a user category based on their interest in a topic, a location or a theme. For example, a first user group can include Italian language users who live in Seattle and are football fans. A second user group can include Italian language users who live in Seattle and are golf fans. A third user group can include Italian language users who live in Seattle and are baseball fans. Thus, in some implementations, the machine translation reranking system maintains a database of users. The users can, in some scenarios, be members of a social media system, employees of an organization, members of a class, or in general can be affiliated with any real or virtual entity.

In some implementations, user group defining engine 350 can also select users. This selection, for example, can be based on a mapping between how a content item has been classified and how users have been classified or defined. If a content item has been classified as belonging to a "football" category and is applicable to people living in Seattle, then the first user group (with reference to the above example) can be selected for providing feedback on the content item translation. In other words, users in a user group can be selected based on a match between an item category and a user category.

Scoring engine 348 assigns an aggregate score to a machine translation based on the feedback received from a group of users, such as a group defined by user group defining engine 350, that received the translation. The scoring engine 348 also can be configured to select a machine translation as the preferred machine translation in response to determining that the selected machine translation has the highest aggregate score amongst all machine translations of the content item. For example, a first group receives the first translation, a second group receives the second translation, and so on. Based on feedback from individual users in each corresponding group, the first translation receives a first aggregate score, the second translation receives a second aggregate score, and so on. Thus the first aggregate score can be an aggregate over all scores supplied by individual users in the first group. Similarly, the second aggregate score can be an aggregate over all scores supplied by individual users in the second group, and so on. If the first machine translation gets the highest aggregate score, then the scoring engine can identify the first machine translation as the preferred machine translation. In various implementations, a machine translation is selected as the preferred machine translation if that machine translation's aggregate score is above a threshold score level, or if that machine translation's aggregate score is a threshold amount above the aggregate scores of other machine translations.

In a scenario when a preferred machine translation has not been found, e.g., when two or more machine translations are candidates for being a preferred machine translation of a content item because neither has a clearly highest aggregate score, scoring engine 348 can be configured to repeat the aggregate scoring process iteratively until either a preferred machine translation is identified based on feedback from additional user groups, or a terminating condition is reached. Thus, for example, in a first iteration, ten users can be polled for each machine translation. In a second iteration, forty users can be polled for each of the five scoring machine translations. In a third iteration, sixty users can be polled for each of the top three scoring machine translations. There is no limitation on the number of users included in a user group that can be polled. In implementations of the machine translation reranking system, an aggregate score can be updated based on the feedback from additional user groups. The terminating condition, for example, can be a maximum number of computer iterations reached, or a maximum number of users in the additional user group(s) selected, or a combination of the above.

In some implementations, the aggregate score also depends on a "user-importance weight" for a user; such a weight can be indicative of how much importance is given to that user's feedback relative to the other users in a group. In some implementations, the user-importance weight for a given content item depends on a comparison of reviews supplied by the user for particular content item translations with average reviews supplied by all users for the same time period. This illustrates that a user's "average scoring" performance in the past can be considered in assigning weights. In some implementations, the user importance weight can be, alternatively or in addition, based on a determination of how likely that user is to be able to correctly review the translation. For example, for a translation of a post to a car enthusiast website, a user who is determined to know about cars, such as based on a history of the user interacting with content items about cars, posting to other car topics web sites, talking to other car enthusiasts, etc., can be given a higher weight.

Those skilled in the art will appreciate that the components illustrated in FIG. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4:
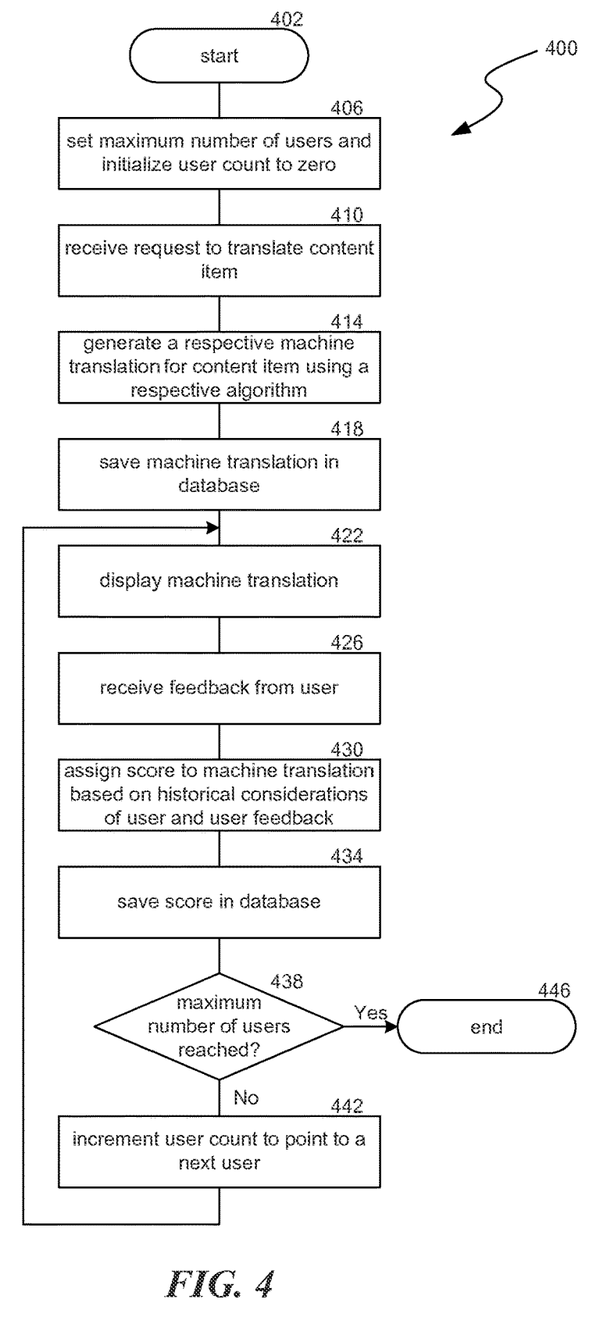
FIG. 4 is a flow diagram illustrating a process used in some implementations for scoring a machine translation of a content item.

FIG. 4 is a flow diagram illustrating a process 400 used in some implementations for scoring a machine translation of a content item. Briefly speaking, in this process, a machine translation of a content item is generated, provided to a group of users for their feedback on the quality of the translation, and then scored based on the feedback. Process 400 starts at block 402 and continues to block 406. This process is repeated until, for a given machine translation, an aggregate score is assigned corresponding to feedback received from every individual user. For example, if a maximum of 50 users are being polled for providing feedback on the quality of a machine translation, then at the end of process 400, 50 reviews can be received and assigned.

At block 406, a maximum number of users is set and a user count is initialized to zero to iterate over all users in a group. The size of a user group depends on the maximum number of users selected in that group. In some implementations, a user group is defined by the machine translation reranking system, i.e., users of a user group are selected for being polled on the feedback of a quality (e.g., a perceived accuracy) of a machine translation of a content item.

In some implementations, users can be given various classifications indicating topics or content item with which the user has knowledge of or frequently interacts with, and therefore is likely to understand the language associated with that topic or type of content item. For example, a user who interacts with motorcycle content, sends messages related to motorcycles, or has friends who know about motorcycles can be classified as knowing language about motorcycles. As another example, a user from a particular location, such as South Korea, can be classified as speaking a dialect specific to that region. In addition, translations can be assigned one or more classification labels, such as based on keywords or other analysis of the content item or its translation, characteristics about a source of the content item, or externals of the content item such as where it was posted, what IP it was posted from, etc. Users can be selected to review the translation based on a match between the user classifications and the classification labels given to the translation. Alternatively or in addition, reviews given by users with a classification matching a classification label assigned to the translation can be given a higher weight.

At block 410, the process receives a request to translate a content item. A request can be accompanied with the content item. In various implementations, the request can indicate a target language of the translation for the content item. Next, at block 414, a machine translation of the content item can be generated using a translation algorithm. The generated machine translation can then be saved in the database at block 418. The machine translation can be presented (or displayed) to users in a user group at block 422, and feedback from a user can be received at block 426. For example, a user may be requested (via a web page, a mobile app, or an email message) to provide a star rating, based on a five star rating scale. Thus, process 400 can iterate between blocks 422 and 442 until feedback from every user in a user group is received. In some implementations, feedback provided by users can be expressed as, but not limited to, star ratings, numeric quantities, letter grades on a scale from A to F, and the like. In some implementations user groups are not pre-defined, and instead, as requests for a translation of a content item are received, the requesting user is considered part of the user group and is provided the translation and an input area to review the translation. In some implementations, only requesting users that match a criteria, such as sharing a classification of the content item to be translated, are provided with the input area to review the translation. In some implementations, translation requests can be provided translations to review, and those that respond with feedback are considered part of the user group.

After receiving feedback from a user at block 430, the machine translation is assigned an aggregate score based on the user's feedback. For example, a user-supplied review can be a positive (integer or non-integer valued) number, such as between a scale of 1 and 5. In some implementations, users can supply comments as a part of feedback associated with the quality of a machine translation. For example, a user can provide a review of 3.5 to the quality of a machine translation, and also provide comments as to how he or she believes that the quality of the machine translation can be improved. For example, he or she might suggest choosing an alternate word or phrase for a translation of a content item. Such suggestions are noted by the server running process 400.

In some implementations, the assigned review depends on a combination of a user-supplied review as well as a user-importance weight. A user-importance weight can be indicative of how much importance is given to a user's feedback, relative to the other users in a group. In some implementations, if a user is consistently above or below a threshold amount different from the average (i.e. the user always gives a 0 or 100 review) the user can be excluded from further reviewing. In an additional example, an assigned review can be a product of a user-supplied review and a user-importance weight. This can be applicable to implementations in which some users' feedback is given greater importance than that of the others. For example, reviews from users who have proven themselves to be exacting reviewers, i.e. they provide lower than average reviews for translations that have only a few mistakes and provide high reviews only to exceedingly accurate translations, can be given greater weight than users who have historically given high reviews even to significantly flawed translations. This weighting value can be determined by comparing a user's given review for each previous translation as compared to the average review for the corresponding translation. For example, a user has provided three previous reviews (on a % scale): 75%, 50%, 30% where the corresponding average for each translation review was 70%, 80%, 60%. In some implementations, the user's weighting value can be calculated as $\Sigma(\text{average/user review})/(\# \text{ of reviews})$, or in this case: $(70/75+80/50+60/30)/3=1.511$. In some implementations, the user weighting value can be adjusted down for inconsistent users. For example, if a user sometimes scores translations higher than average and sometimes lower than average, without consistently doing either, the weighting value for that user can be lowered to account for the uncertainty in their scores. In some implementations, the user important weight can be computed based on the differences between a user's historical review and the average review for that sentence, then summing over all the sentences. Mathematically this can be calculated as:

$Wu$ as $W(u)=1/n_u *\text{sum } W(u,i)$ where $n_u$ is the number of translations reviewed by user u; $W(u, i)$ is user's review score of sentence i. This follows a normal distribution $N(x_i, \sigma_i)$ where $x_i$ is the average review score for sentence i; and $\sigma_i$ is the score variance for sentence i.

At block 434, the assigned review is saved in a database. The process determines at block 438 whether or not all the users in a group (e.g., the maximum number of users) have provided their feedback. If all the users have not provided their feedback, the process increments (at block 442) a user count variable to point to the next user in the group and then loops back to block 422. Accordingly, process 400 iterates between block 422 and block 442 until feedback from every user in a user group is received. In some implementations, the translation reviewing process 400 can be performed without a specified size of user groups and reviews can be accumulated continuously or until a preferred translation is selected, such as is discussed below in relation to process 500. If all the users have provided their feedback, the process 400 terminates at block 446.

Figure 5A:
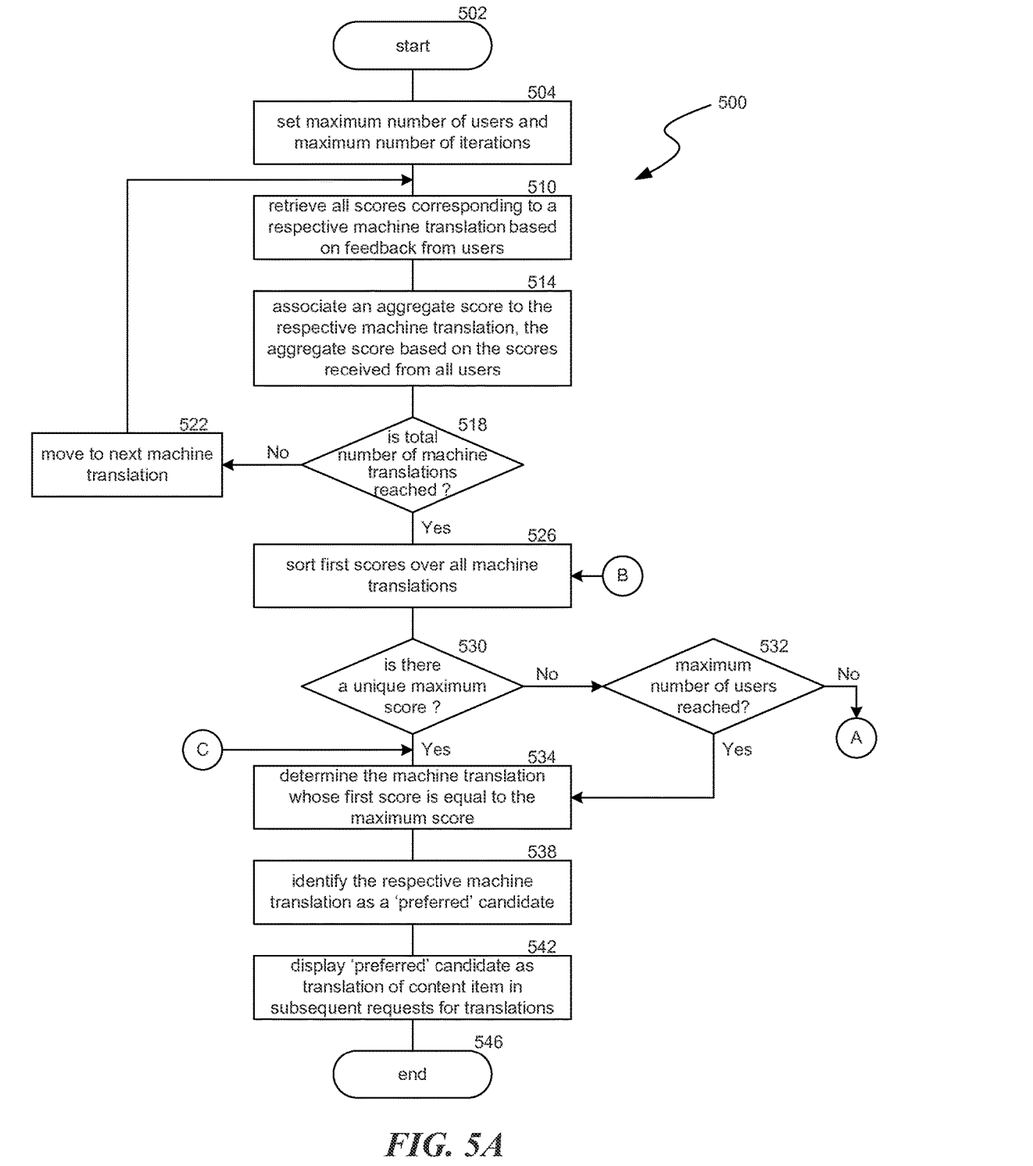
FIGS. 5A and 5B are flow diagrams illustrating a process used in some implementations for identifying a preferred machine translation from multiple machine translations of a content item.
Figure 5B:
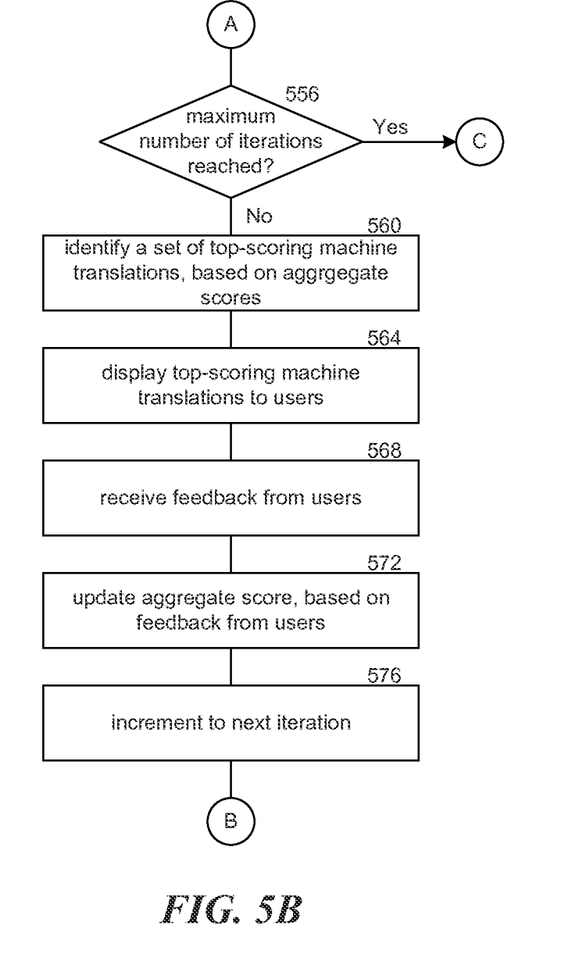

FIGS. 5A and 5B are flow diagrams illustrating a process 500 used in some implementations for identifying a preferred machine translation from multiple machine translations of a content item. Different machine translation algorithms can generate different machine translations of the content item, and it would be beneficial to be able to select one that is better than the others (i.e. a preferred translation). In some implementations, process 500 distributes different machine translations to different user groups, and ranks these different machine translations based on user feedback. For example, a first group receives the first translation, a second group receives the second translation, and so on. Feedback from each group is used to calculate an "aggregate" score for that machine translation. The aggregate score for a respective machine translation is based on the users who received the respective machine translation. The machine translation that gets the highest aggregate score is identified as the preferred machine translation. Where no machine translation receives an aggregate score significantly higher than the other translations' aggregate scores, process 500 can reiterate to receive additional reviews for top-scoring translations. Process 500 starts at block 502 and continues to block 504.

At block 504, a maximum number of users is set and a maximum number of iterations is initialized to zero. In some implementations, process 500 iterates until a preferred machine translation is identified, or until the maximum number of iterations is reached. In some implementations, a user group is defined by the machine translation reranking system, such as a group comprising users who will be polled for feedback on the quality (e.g., a perceived accuracy) of a machine translation of a content item. In some implementations, a user group is defined as a number of users, and users are added to the group as they provide reviews for a translation version.

Blocks 510, 514, 518, and 522 are used for repeating over multiple machine translations. In implementations of the present disclosure, multiple machine translations of a content item are generated, all translations being in the same target language. Each machine translation is provided to a user group for their feedback on the quality of the translations, the machine translations are assigned aggregate scores based on the feedback, and the aggregate scores are finally used in determining a preferred machine translation from the multiple machine translations of the content item.

At block 510, the aggregate scores corresponding to a machine translation can be retrieved (typically from a memory or a database). In some implementations, these aggregate scores can be based on the reviews assigned in block 430 shown in FIG. 4. The retrieved review can be based directly on reviews provided by a user, or based on textual feedback from a user. Further, as described in FIG. 4, the retrieved review can also be based on a user-importance weight indicating how much importance is to be given to that user's feedback relative to the other users in a group.

Using the retrieved reviews, an aggregate score is computed for (at block 514) with a respective machine translation. In some implementations, the aggregate score can be previously computed for the machine translation, such as is shown above at block 430. Thus, for example, an aggregate score of a machine translation can be the arithmetic average of the retrieved reviews. The aggregate score, in alternate implementations, can be based on any mathematical formula such as median or mode, and is not necessarily limited to the arithmetic average.

Next, at block 518, process 500 determines whether or not every machine translation has been associated with an aggregate score. If every machine translation has not been considered, process 500 proceeds to block 522 to move to a next translation, and then loops back to block 510. Otherwise, if every translation has been associated with an aggregate score, process 500 proceeds to block 526. Hence, once every machine translation has been considered, each machine translation is associated with an aggregate score.

At block 526, the aggregate scores are sorted over all machine translations. For example, the machine translation with the highest aggregate score can be given rank 1, the machine translation with second-to-highest aggregate score can be given rank 2, and so on. Next, process 500 determines (at block 530) if there is a unique maximum aggregate score. In various implementations the, unique maximum aggregate score is one of: the highest ranked aggregate that is greater than a threshold; or an aggregate score that is a threshold amount above all other aggregate scores.

If there is no unique maximum aggregate score, e.g., the difference of the aggregate scores of the two or more machine translations is less than a threshold, process 500, at block 532, determines whether a maximum number of users in a group has been reached or not. If the maximum number of users has not been reached, process 500 proceeds to the sub-routine shown in FIG. 5B.

If, however, the maximum number of users has been reached, process 500 moves to block 534. At block 534, process 500 determines the machine translation with the highest aggregate score. In some examples if a machine translation with a unique maximum aggregate score cannot be determined (i.e., there is a tie among top-scoring translations), process 500 selects a top-scoring translation. The respective machine translation is identified at block 538 as a preferred candidate. The preferred candidate is displayed (at block 542) as the translation of the content item in subsequent requests for machine translations of that content item. In other words, better quality translations are provided to users who later request translations of the content item, partly due to the scoring system employed to determine a preferred machine translation from multiple machine translations. Process 500 terminates at block 546.

Now referring to FIG. 5B, a subroutine is shown for, when a machine translation with a unique maximum aggregate score has not been found, updating the aggregate score associated with one or more machine translations. Such a situation, for example, arises when two or more machine translations are potential candidates for being a preferred machine translation. The subroutine in FIG. 5B is repeated iteratively until either a preferred machine translation is identified based on feedback from additional user groups, or a terminating condition is reached. In some implementations of the machine translation reranking system, the aggregate score (calculated, for example, as shown in FIG. 5A) is updated based on the feedback from additional user groups. The terminating condition, for example, can be an allowed maximum number of computer iterations reached for identifying (or selecting) a preferred machine translation from multiple machine translations, or a maximum number of users in the additional user group(s) selected, or a combination of the above. The additional user groups can include the users who have provided feedback earlier. For example, in a first iteration, 50 users are polled for each machine translation. In a second iteration, 200 users are polled for each machine translation, and in a third iteration, 1000 users are polled for each translation. In some implementations, the number of users polled in an iteration can be either more or less than the number polled in a subsequent iteration. In some implementations, various other terminating conditions can be employed.

Process 500 determines (at block 556) if a maximum number of iterations (e.g., indicated in the form of a terminating condition for the sub-routine) has been reached. If the maximum number of iterations has not been reached, the process moves to block 560. At block 560, based on the aggregate scores (calculated in block 514 or updated at block 572, a set of top-scoring machine translations are identified. In some implementations, the top-scoring machine translations can be those translations whose aggregate scores lie within a fixed percentage (e.g., 10%) of the top aggregate scores. In some examples, the top-scoring machine translations can be a fixed number (e.g., five) of the top-scoring translations. In some implementations, the top-scoring machine translations can be those machine translations whose aggregate scores do not differ from each other by a value greater than a threshold.

Next, at block 564, each of the top-scoring machine translations is presented to users in a user group, and feedback from the users is received at block 568 as discussed in more detail in relation to FIG. 4. In some implementations, the size of the user group can increase from one iteration to the next, until a maximum number of iterations is reached, or until, for a given iteration, a maximum number of users in a user group is reached. After receiving feedback from users in a user group, the aggregate score is updated. For example, the aggregate score can be a sum of all user reviews, an average, a weighted average, a median, etc. Then, process 500 increments an iteration counter (at block 576) and loops back to block 526.

Figure 6:
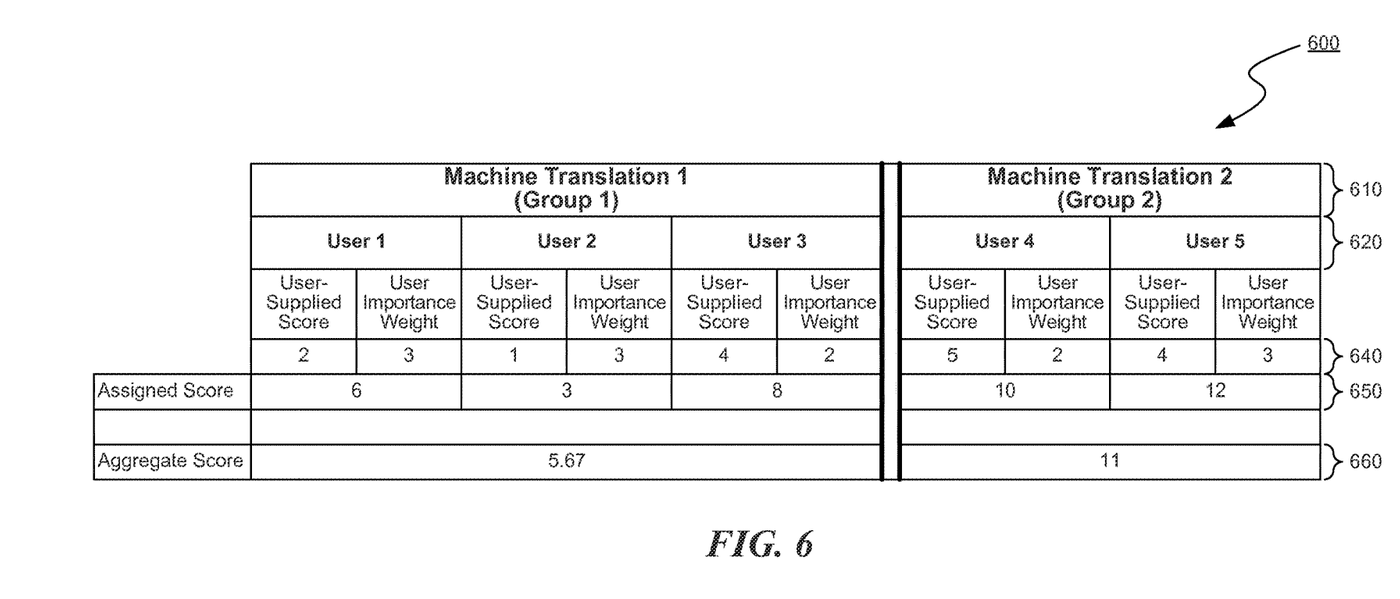
FIG. 6 is a table diagram usable as an illustrative example showing results in a database.

FIG. 6 is an illustrative example 600 showing a scoring process. In some implementations, users can supply reviews, in addition to, or in lieu of, textual feedback associated with the quality of a machine translation. Hence, an assigned review can be computed either directly using a user review, or based on a user's textual feedback. For a given machine translation, the user-supplied reviews (received from all users) can be used to calculate an aggregate score for that machine translation. In some implementations, an assigned review is calculated based on the user-supplied reviews, and then the assigned review can be used to calculate the aggregate score. In some examples, such as shown in FIG. 6, the assigned review can also depend on a user-importance weight, in addition to the user-supplied review. The user-importance weight can be based on the user's historical contribution in providing feedback to machine translations. For example, an assigned review can be a product of a user-supplied review and a user-importance weight, as shown in FIG. 6.

FIG. 6 is a table diagram usable as an illustrative example 600 showing results in a database. In example 600, a first machine translation ("Machine Translation 1") is provided to a first user group ("Group 1") and a second machine translation ("Machine Translation 2") is provided to a second user group ("Group 2"), as indicated in row 610. Group 1 includes three users: User 1, User 2, and User 3. Group 2 includes two users: User 4 and User 5, as indicated in row 620. In some implementations, a user can belong to multiple user groups, and accordingly such a user can be requested to provide feedback for multiple machine translations of the same content item. Further, in some implementations, a user can belong to a single user group only, and thus such a user can be requested to provide feedback for a single machine translation.

In example 600, in Group 1, the user-supplied reviews provided by User 1, User 2, and User 3 are 2, 1, and 4 respectively, as indicated in row 640. The user-importance weight for these users in Group 1 are 3, 3, and 2 respectively, as also indicated in row 640. With regard to Group 2, the user-supplied reviews provided by User 4 and User 5 are 5 and 4 respectively, as indicated in row 640. The user-importance weight for these users in Group 2 are 2 and 3 respectively, as also indicated in row 640.

The assigned review can be a product of a user-supplied review and a user-importance weight. Thus, the assigned review for User 1, User 2, and User 3 in Group 1 are 6, 3, and 8 respectively, as indicated in row 650. Also, the assigned review for User 4 and User 5 in Group 2 are 10 and 12 respectively, as indicated in row 650. Based on the assigned review per user, per user group, the aggregate score can be computed. In the example shown in FIG. 6, the aggregate for the machine translation is computed as the arithmetic average of the assigned reviews. Hence, the aggregate score for the first machine translation is computed as 5.67 (average of 6, 3, and 8), as indicated in row 660. Also, the aggregate score for the second machine translation is computed as 11 (average of 10 and 12), as indicated in row 660. Accordingly, in this example, the second machine translation is declared as the preferred translation. In subsequent instances, when users request machine translations of the content item, the second machine translation is displayed/provided to users. Thus, it can be appreciated that the scoring system employed to determine a preferred machine translation from multiple machine translations results in better quality translations in response to subsequent requests for translations of the content item. In some implementations, an assigned review is not separately computed. Rather, an aggregate score associated with a machine translation can be directly computed based on feedback received from users. Additionally, in some implementations, a user-importance weight can be mathematically and/or logically combined with a user's review in various ways.

While FIG. 6 discussed above shows a table whose contents and organization are designed to make them more comprehensible by a human reader, those skilled in the art will appreciate that actual data structures used by the facility to store this information may differ from the table shown, in that they, for example, may be organized in various other ways; may contain more or less information than shown; may be compressed and/or encrypted; etc.

Several implementations of the disclosed technology are described above in reference to the figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

I claim:

1. A method performed by a computing system for selecting a preferred machine translation of a content item, comprising:
   classifying the content item based on one or more categories, the categories including at least the topic of the content item;
   classifying a plurality of users based on one or more categories, the one or more categories including at least an interest in one or more topics;
   generating multiple computer-generated translations of the content item in a specified target language using configurable parameters, the multiple translations forming a set of translations;
   performing one or more iterations, each iteration comprising:
      selecting multiple groups of users based on a mapping between the one or more content item categories and the one or more user categories;
      submitting each translation in the set to one group of users;
      receiving, from each user in the group, a translation score for the reviewed translation;
      weighting the translation score received from each user by a user-importance factor calculated as a function of a deviation of the user's scores from average scores for previous translations;
      computing an aggregate score for each reviewed translation based on the weighted scores from all users in the reviewing group;
      determining if the iteration has produced a preferred translation, the preferred translation being a translation from the set having an aggregate score above a predetermined threshold, or a translation having an aggregate score higher than the aggregate score for all other translations in the set by a predetermined threshold; and
      repeating the iteration if no preferred translation has been produced; and
   providing the preferred machine translation in response a subsequent request for a translation of the content item.

2. The method of claim 1, wherein:
   the method further comprises updating the configurable parameters based on at least one of the aggregate scores computed during the aggregate updating iterations.

3. The method of claim 1, wherein the interest of the users in a topic is determined based on interactions with a social media web site.

4. The method of claim 3, wherein the classification assigned to each user is further based on the user's location, or a theme.

5. The method of claim 4, wherein the classification assigned to the content item is further based on a content item topic, a content item location, a content item theme, or a content item source.

6. The method of claim 5, wherein:
   the number of users in each group of users is increased in each subsequent iteration.

7. The method of claim 1, wherein the user-importance factor is based on a ratio of an average review supplied by the particular user for multiple translations and an average review supplied by all users for multiple translations.

8. The method of claim 6, wherein, in each subsequent iteration
   the groups of users are at least twice as large as the groups of users from the previous iteration.

9. A computer readable memory storing instructions configured to, when executed by a computing system, cause the computing system to perform operations for identifying a preferred machine translation of a content item, the operations comprising:
   classifying the content item based on one or more categories, the categories including at least the topic of the content item;
   classifying a plurality of users based on one or more categories, the one or more categories including at least an interest in one or more topics;
   generating multiple computer-generated translations of the content item in a specified target language using configurable parameters, the multiple translations forming a set of translations;
   performing one or more iterations each iteration comprising:

selecting multiple groups of users based on a mapping between the one or more content item categories and user categories;

submitting each translation in the set to one group of users;

receiving, from each user in the group, a translation score for the reviewed translation;

weighting the translation score received from each user by a user-importance factor calculated as a function of a deviation of the user's scores from average scores for previous translations;

computing an aggregate score for each reviewed translation based on the weighted scores from all users in the reviewing group;

determining if the iteration has produced a preferred translation, the preferred translation being a translation from the set having an aggregate score above a predetermined threshold, or a translation having an aggregate score higher than the aggregate score for all other translations in the group by a predetermined threshold; and repeating the iteration if no preferred translation has been produced; and providing the preferred machine translation in response a subsequent request for a translation of the content item.

10. The computer readable memory of claim 9, wherein the aggregate score is further based on a user-supplied review for each user providing a translation score.

11. The computer readable memory of claim 9, wherein the user-importance factor is based on a ratio of an average review supplied by the selected user for multiple translations and an average review supplied by all users for multiple translations.

12. A system for identifying a preferred machine translation of a content item, comprising:
 a content item classification engine configured to classify the content item based on one or more categories, the categories including at least the topic of the content item;
 a user group defining engine configured to classify a plurality of users based on one or more categories, the one or more categories including at least an interest in one or more topics;
 a machine translation generation engine configured to generate multiple computer-generated translations of the content item-in a specified target language the multiple translations using configurable parameters and forming a set of translations; and
 a scoring engine configured to:
 perform one or more iterations each iteration comprising:
  selecting multiple groups of users based on a mapping between the one or more content item categories and the one or more user categories;
  submitting each translation in the set to one group of users;
  receiving, from each user in the group, a translation score for the reviewed translation;
  weighting the translation score received from each user by a user-importance factor calculated as a function of a deviation of the user's scores from average scores for previous translations;
  computing an aggregate score for each reviewed translation, based on the weighted scores from all users in the reviewing group;
  determining if the iteration has produced a preferred translation, the preferred translation being a translation from the set having an aggregate score above a predetermined threshold, or translation having an aggregate score higher than the aggregate score for all other translations in the group by predetermined threshold; and
  repeating the iteration if no preferred translation has been produced
 providing the preferred machine translation in response a subsequent request for a translation of the content item.

13. The system of claim 12, wherein the aggregate score is further based on a user-supplied review for each user providing a translation score.

14. The system of claim 12, wherein the iterations are terminated after a predetermined number of iterations or until a predetermined number of users has reviewed each translation in the set, and further wherein the preferred translation is the translation having the highest aggregate score.

15. The system of claim 12, wherein the set of translations, in subsequent iterations, includes only a subset of the translations from the previous iteration, the subset including:
 a fixed number or percentage of the previous set of translations that have the highest computed aggregate scores; or
 translations, from the previous set of translations having aggregate scores that are higher than the computed aggregate scores for non-selected computer-generated translations and that do not differ from each other by a value greater than a threshold.

16. The method of claim 1, wherein set of translations, in subsequent iterations, includes only a subset of the translations from the previous iteration, the subset including:
 a fixed number or percentage of the previous set of translations having the highest computed aggregate score; or
 translations, from the previous set of translations, whose computed aggregate scores are both higher than the computed aggregate scores for non-selected translations and that do not differ from each other by a value greater than a threshold.

17. The computer readable memory of claim 9, wherein the set of translations, in subsequent iterations, includes only a subset of the translations of the previous set of translations, including:
 a fixed number or percentage of the previous set of translations having the highest computed aggregate scores; or
 translations, from the previous set of translations, whose computed aggregate scores are both higher than the computed aggregate scores for non-selected translations and that do not differ from each other by a value greater than a threshold.

* * * * *

UNITED STATES PATENT AND TRADEMARK OFFICE
CERTIFICATE OF CORRECTION

PATENT NO. : 10,067,936 B2
APPLICATION NO. : 14/586022
DATED : September 4, 2018
INVENTOR(S) : Fei Huang Page 1 of 1

It is certified that error appears in the above-identified patent and that said Letters Patent is hereby corrected as shown below:

In the Claims

Column 14, Lines 37-38, replace "based on a content item topic, a content item location," with -- based on a content item location, --.

Column 15, Line 47, replace "content item-in a" with -- content item in a --.

Column 16, Line 14, replace "been produced providing the preferred machine translation in response a subsequent request for a translation of the content item." with -- been produced. --.

Signed and Sealed this
Sixth Day of November, 2018

Andrei Iancu
*Director of the United States Patent and Trademark Office*